United States Patent Office 3,004,086
Patented Oct. 10, 1961

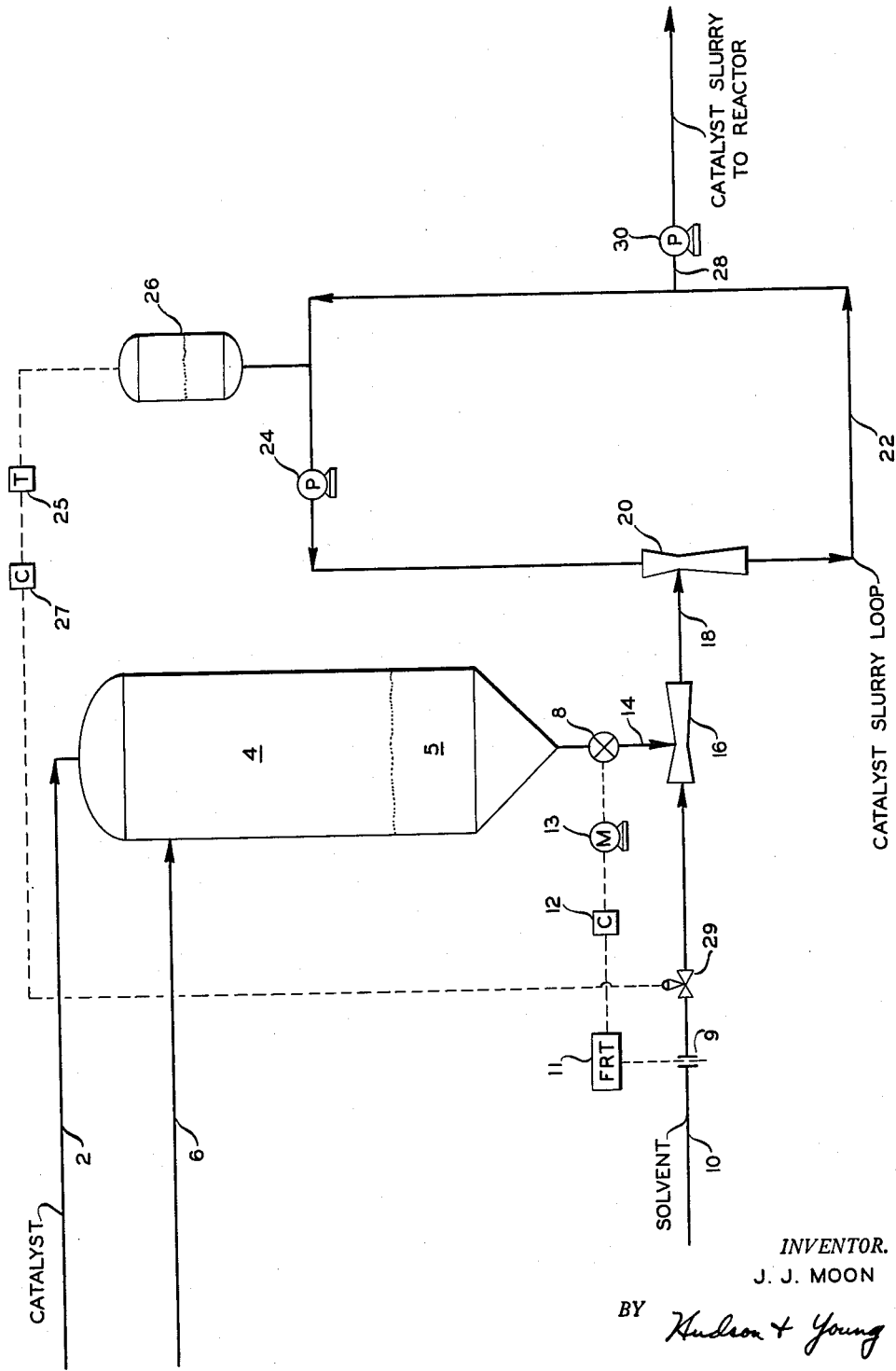

3,004,086
METHOD AND APPARATUS FOR PROVIDING A SOLIDS SLURRY
John J. Moon, Bartlesville, Okla., assignor to Phillips Petroleum Company, a corporation of Delaware
Filed Aug. 27, 1956, Ser. No. 606,274
15 Claims. (Cl. 260—683.15)

This invention relates to method and apparatus for forming a slurry of a subdivided solid material in a liquid. In one aspect it relates to method and apparatus for forming a slurry of solid catalyst in a liquid for introduction to a reaction zone. In another aspect it relates to method and apparatus for forming slurry of a solid catalyst which is poisoned by water in a liquid in controlled proportions and feeding the slurry to a reaction zone at a controlled rate.

It is an object of this invention to provide improved process and apparatus for slurrying solids in a liquid.

Another object of the invention is to provide an improved process and apparatus for forming a slurry of solid catalyst in a liquid material for introduction to a polymerization reaction zone.

Still another object of the invention is to provide an improved process and apparatus for controlling the composition and feed rate to a reaction zone of a slurry of subdivided solid catalyst in a liquid.

These and other objects of the invention will become more readily apparent from the following detailed description and discussion.

In carrying out this invention, the above objects are achieved broadly by passing subdivided solids through a proportioning means to the suction of an eductor in which said solids are picked up and entrained by a flowing liquid. The slurry which results is discharged through a continuous circulating loop from which slurry is withdrawn for passage to a reaction system.

In one aspect the subdivided solids to be slurried are catalyst solids which are poisoned by water. In this aspect of the invention, the solids are introduced to the proportionating means from a vessel from which air is excluded, either by maintaining therein in an inert gas atmosphere or by introducing the solids to said vessel beneath the level of a liquid.

In another aspect of the invention, the amount of slurry introduced to the circulating loop is controlled by varying the amount of slurrying liquid in response to pressure changes in the loop which result from variations in the feed rate to the reaction system.

In carrying out the invention in one embodiment thereof, a finely divided solid material, for example a catalytic material, is introduced to an eductor where it is picked up and entrained in a flowing liquid. In order to control and provide a measurement of the solids, they are introduced to the eductor through a positive displacement means which is actuated by the flowing liquid, such that a change in the quantity of said liquid produces a proportionate change in the amount of solids. The material leaving the eductor, comprising a slurry of solids in liquid, is passed to a closed circulating system wherein a continuous flow of circulating slurry is maintained. Any suitable means can be provided for maintaining the flow of slurry in this system, such as for example, a conventional pumping apparatus. At a selected point in the circulating system, slurry is withdrawn for such further treatment or use as may be desired, such as for example, for introduction to a reaction system.

This invention is applicable to the treatment of solids in general, such as for example, inert materials like sand, Carborundum, pumice, etc., materials suitable for conversion to reaction products, like coal, shale, lignite, etc., and catalytic materials like metals, metal oxides, for example, silica, alumina, silica-alumina, etc. The solids are subdivided to provide materials which are readily maintained in the form of a slurry. The degree of subdivision required varies depending on the particular solid or solids and the slurrying liquid employed. More usually the solids range in size from between about 1 to about 200 microns and preferably between about 10 and about 150 microns. The quantity of solids which can be retained in the slurry is readily determined and is also dependent on the type of solids employed, the liquid used, the liquid velocity, etc. It is possible to form and maintain slurries having a solids content as high as 0.5 to 1.0 pound of solid per pound of liquid.

Although any of the solids previously given are suitable for treatment in the method of this invention, the invention is particularly applicable in the handling of catalytic materials and in its preferred embodiment is directed to the slurrying of catalysts which are employed in the polymerization of olefinic materials to solid polymers thereof.

The olefin polymerization process can be used to produce a wide variety of olefin polymers, such as for example: polymers or copolymers of mono-olefins like ethylene, propylene, butylene, etc.; also copolymers of mono-olefins and di-olefins such as butadiene, isoprene, etc. These polymers are prepared usually by contacting the olefin to be polymerized with a catalyst in the presence of a solvent or diluent material at an elevated temperature and pressure. A number of catalytic materials can be used for the purpose of polymerizing olefins, the most desirable being chromium oxide, preferably containing hexavalent chromium, with silica, alumina, zirconia, thoria, silica-alumina, etc. These catalysts can be prepared, for example, by contacting soluble salts of chromium with silica, alumina, thoria, etc., for a sufficient period of time to impregnate the latter material. Following this, excess liquid is removed, for example, by filtering, after which the solid catalysts are dried and activated at temperatures in the range of 450° F. to 1500° F. under non-reducing conditions for several hours. For a detailed discussion of the catalysts, their composition and their methods of preparation, reference can be had to the copending application of Hogan and Banks, Serial No. 573,877, filed March 26, 1956, now U.S. Patent No. 2,825,721 wherein the catalysts are discussed in detail. These and other solid catalysts or catalysts containing a solid component can be treated in the method of this invention.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is maintained at a sufficient level to assure a liquid phase reaction, that is at least about 100 to 300 p.s.i.g., depending upon the type of feed material, diluent and the polymerization temperature. Higher pressures up to 500 to 700 p.s.i.g. or higher can be used, if desired. The feed-to-catalyst ratio varies from as low as about 0.1 to about 20 volumes of feed per volume of catalyst, with the preferred range being between about 1 and about 6 volumes per volume. Generally, it is desirable to provide a reactant residence time of between about 15 minutes and about 12 hours.

The use of a diluent in the polymerization reaction in general serves two purposes. Since the reactions are usually exothermic in nature, the presence of a quantity of diluent provides a method for obtaining close control of the reaction temperature. In addition, polymers formed in the reaction, or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic paraffins having between about 3 and about 12 carbon atoms per molecule, such as, for example, propane, isobutane, n-pentane, isopentane, isooctane, etc. and preferably those acyclic paraffins having 5 to 12 carbon atoms per molecule. Also useful in the polymerization reaction are alicyclic hydrocarbons, such as cyclohexane, methylcyclohexane, etc. Aromatic diluents are also used, however, in some instances they (or impurities therein) tend to shorten the catalyst life, therefore, their use will depend on the importance of catalyst life. All of the foregoing and in addition, other hydrocarbon diluents which are relatively inert and in the liquid state at the reaction conditions may also be employed in carrying out the reaction of olefins to form solid polymers.

Although the invention is applicable to polymerization systems in general, it finds particular use in processes for the polymerization of 1-olefins having a maximum of 8 carbon atoms per molecule and no branching nearer the double bond than the 4-position; and more particularly in processes for the polymerization of ethylene under conditions which provide polymers of ethylene which have a density of at least 0.94 and preferably 0.96 or higher and a crystallinity of at least 70 percent and preferably at least 80 percent at normal atmospheric temperatures. While the polymerization of ethylene provides a preferred embodiment of the invention, it is not intended that the scope of the invention be limited thereby but that any of the other processes described are also within the invention.

One method of preparing polymers of olefins is described in detail in a patent of Hogan and Banks, U.S. 2,825,721, issued March 4, 1958. This particular method utilizes a chromium oxide catalyst, preferably containing hexavalent chromium, with silica, alumina, silica-alumina, zirconia, thoria, etc. In the method of the Hogan et al. application, olefins are polymerized in the presence of a hydrocarbon diluent, for example, an acyclic, alicyclic or aromatic compound which is inert and in which the formed polymer is soluble. The reaction is ordinarily carried out at a temperature between about 150° F. and about 450° F. and under a pressure sufficient to maintain the reactant and diluent in the liquid states. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity, at normal atmospheric temperatures.

The handling of catalysts used for the polymerization of olefins poses a problem which is not present in the treatment of materials like sand, Carborundum, coal, shale and many catalytic materials. It has been found that the polymerization catalysts are poisoned by certain materials among which is water, such as for example, by the moisture in the air. Therefore, in handling materials of this type, it is necessary that steps be taken to prevent contact of the catalyst with air or other sources of water. In the method of this invention the catalyst prior to slurrying is introduced to an accumulating zone from which air is excluded and from there is passed through a positive displacement means and into a slurrying liquid. In one method of operation, air is excluded from the accumulating zone by maintaining therein an inert atmosphere for example by the used of a gasiform material such as nitrogen, flue gas, etc. The solids entering the accumulating zone pass through this inert atmosphere and are deposited in a bed in the bottom of the zone from which the desired quantity of solids are withdrawn. In another method of operation, air and moisture are excluded from the accumulating zone by maintaining this zone full of liquid, preferably of the same composition as the slurrying liquid, however, other liquids which are not inimical to the formation and maintenance of the slurries or the subsequent use thereof can also be employed. When an inert gas is used to supply the inert atmosphere in the manner described, some of the gas passes from the accumulating zone with the catalyst feed and is dissolved and/or entrained in the slurrying liquid. This gas must subsequently be removed by a treating step. On the other hand, if the accumulating zone is maintained free of moisture by supplying thereto an inert liquid, the problem of gas absorption and entrainment in the slurry does not arise.

As previously stated, the solids introduced to the slurrying liquid are passed through a positive displacement means which provides a measure of the quantity of solids introduced to the system. By the use of appropriate instrumentation an operation is provided wherein the quantity of solids is controlled responsive to changes in the amount of slurrying liquid introduced to the system. By also providing a means for measuring the flow of the slurrying liquid and means for controlling this flow, it is possible to obtain variable determined quantities of slurry having any desired solids concentration. The type of positive displacement means employed varies depending on the solids being handled. In some cases, a star valve can be used; in others, a positive displacement type of pump is more desirable. The entrainment of solids in the slurrying liquid and the formation of the slurry is effected in a suitable eduction means, such as a venturi. If desired, introduction of the slurry to the closed circulating loop can also be effected by providing therein a similar apparatus, however, usually a simple T is suitable for this purpose.

It sometimes happens that due to a decrease in catalyst activity or for another reason, the polymerization reaction rate is decreased with the result than an increased flow of fresh catalyst to the reaction is necessary. On the other hand, conditions in the reaction zone may vary so that a decrease in catalyst feed thereto is called for. In the method of this invention, changes in the rate of catalyst withdrawal from the circulating loop cause variations in the pressure in the loop which are transmitted to the slurrying liquid source, increasing or decreasing the flow of this material as required to provide the desired quantity of catalyst and return the loop pressure to its previous level. The system of this invention can be applied whether the catalyst feed to the polymerization zone is varied manually or by automatic instrumentation.

In order to more fully describe the invention and provide a better understanding thereof, reference is made to the accompanying drawing which is a diagrammatic illustration of apparatus suitable for carrying out a preferred embodiment of the invention. Referring to the drawing, a chromium oxide catalyst containing hexavalent chromium and supported on silica-alumina is introduced through conduit 2 to an accumulating or feed zone 4, which is maintained liquid full of cyclohexane. The catalyst passes downwardly through the liquid and accumulates in a bed 5 in the bottom of the vessel. Solvent material, in this specific example, cyclohexane, is introduced to the system through conduit 10 and passes through an eductor 16 of the venturi type, such as a Penberthy Jet Pump, and into conduit 18. As liquid flows through the eductor, catalyst passes from the feed vessel through a star valve 8 and conduit 14 and is entrained in the liquid. The turbulence created in the eductor is sufficient to disperse the solids in the liquid whereby a substantially homogeneous slurry is formed.

An orifice 9 such as a Builders-Providence flow orifice (Builders Providence Bulletin 309A) is provided in conduit 10. Solvent flowing through the orifice produces a pressure differential which is proportional to the flow rate. The differential actuates a transmitter 11 such as a Foxboro electric d./p. cell (Foxboro Bulletin 450, page 23) which produces an electrical signal proportional to flow, which is fed to a motor speed control 12 such as a GE "Thy-Mo-Trol" controller (General Electric Apparatus Handbook, Book I, Sheet 1125, pages 11–16, February 5, 1951). This, in turn, controls the speed of a drive motor 13 which operates a star valve 8 such as an Omega Roto-Lock feeder (Omega Machine Co., Catalogue on Feeders, pages 50–53). The material from the feeder is introduced to the solvent stream in eductor 16. As long as the solvent flow rate through conduit 10 remains constant, the speed of motor 13 does not vary; however, if the solvent increases, the described control system provides a proportional increase in the rate of catalyst fed through valve 8 and, conversely, a decrease in solvent flow rate produces a proportional decrease in the quantity of catalyst introduced to the eductor. By operating in this manner, it is possible to provide a slurry having a substantially constant solids content at all times.

The slurrying material passes from conduit 18 and is introduced to a second eductor 20 which discharges to a closed catalyst slurry loop 22. The material in the loop is introduced to the suction of pump 24 and discharged therefrom into the suction of eductor 20. Withdrawal of catalyst slurry from the system is provided through conduit 28 and pump 30 and withdrawn material is passed to a polymerization reactor (not shown). Since the catalyst slurry loop 22 is open through conduit 28 to catalyst pump 30, any changes in the catalyst feed rate to the polymerization zone are immediately reflected by changes in pressure in the circulating loop 22.

Automatic compensation for pressure variations in the circulating loop is provided by a control system which includes a pressure pot 26, a suitably shaped vessel, such as a cylinder, adapted to contain a level of liquid superimposed by a gas under pressure. The liquid is an open communication with the circulating loop 22 and comprises a portion of the liquid from the slurry therein, usually substantially free from catalyst due to settling. The gas in contact with the pressure pot liquid can be any gas inert to the system, such as nitrogen, methane, ethane, etc. Ethylene can also be used for this purpose, and may be preferred in that there is no subsequent separation problem. As the slurry withdrawn from the loop through conduit 28 is increased or decreased in quantity the liquid level in the pressure pot is changed, the result being a decrease or increase in the pressure of the superposing gas. These changes in pressure are fed to a pressure transmitter 25, such as a Republic pneumatic transmitter (Republic Data Book No. 1000, pages 15–18) which in turn sends a pneumatic signal proportional to pressure to a controller such as Foxboro model 40 pneumatic controller (Foxboro Bulletin 450, pages 52–53). This controller transmits a pneumatic signal to a flow controlling motor valve 29 such as a Fisher diaphragm motor valve. As long as the rate of catalyst withdrawal from the loop remains constant, the motor valve 29 admits a constant amount of solvent to the system. However, if an increased amount of catalyst is withdrawn from the loop, the reduction in pressure which results causes an immediate increase in the flow of solvent through conduit 10 and a corresponding increase in the amount of slurry produced in eductor 16. If, on the other hand, the catalyst withdrawal rate is decreased, the control system described acts to produce a decreased amount of make-up slurry. Thus, any variations in catalyst demand are automatically compensated for by increasing or decreasing the flow of solvent and correspondingly catalyst slurry to the catalyst slurry loop.

The preceding embodiment has been directed to a process which utilizes a specific instrumentation arrangement. This is not intended, however, to limit the scope of the invention and other conventional instruments and other instrument arrangements which provide the control functions of this invention are also used.

The following example is given in illustration of a typical application of the invention:

*Example*

Cyclohexane at a rate of about 20,500 pounds per hour is introduced through conduit 10 and eductor 16 to circulating loop 22. At the same time a chromium oxide polymerization catalyst subdivided to a size range of about 1 to about 200 microns is introduced to a feed vessel 4, which is filled with cyclohexane. From this vessel the catalyst is entrained in the flowing solvent in eductor 16 at a rate of about 2000 pounds per hour. Sufficient cyclohexane accompanies the catalyst from zone 4 to provide a slurry leaving the eductor 16, having a liquid to solid ratio by weight of about 10.5, to 1. Circulation of slurry in the catalyst loop is maintained by a Milton-Roy controlled volume pump. Catalyst is withdrawn from the loop for use in a polymerization reactor through a second Milton-Roy pump 30. With the system operating at equilibrium, the amount of catalyst slurry so withdrawn is equal in quantity to the slurry introduced to the circulating loop. An instrumentation system the same as that previously described in conjunction with the drawing is provided for the purpose of controlling the system.

During the course of the polymerization reaction the catalyst becomes partially deactivated and it becomes necessary to increase the feed rate of fresh catalyst. This is provided by increasing the rate of speed of pump 30 to provide a catalyst rate of about 2100 pounds per hour. The immediate result of this increase in catalyst rate is a drop in pressure in the catalyst slurry loop which is transmitted to the control system to motor valve 29, which opens, allowing the solvent flow rate therethrough to increase to about 21,525 pounds per hour. The increased solvent flow through orifice 9 is in turn transmitted to motor 13 which increases the rotation rate of star valve 8 to provide a sufficient increase in the catalyst rate to eductor 16 to maintain the 10.5 to 1 ratio of solvent to solids in the slurry entering the circulating loop.

Having thus described the invention by providing specific examples thereof, it is to be understood that no undue limitations or restrictions are to be implied by reason thereof and that many variations and modifications are clearly within the scope of the invention.

I claim:

1. A process for feeding subdivided solids to a reaction system which comprises withdrawing the solids from a source of supply, introducing said solids directly to a confined zone adapted to contain a bed of said solids, maintaining the confined zone free from moisture, withdrawing solids from the confined zone, slurrying the solids in a measured amount of flowing liquid, varying the rate of solids withdrawal responsive to changes in the quantity of said flowing liquid, introducing the resulting solids-liquid slurry to a circulating system having a point of withdrawal by which slurry is continuously passed, withdrawing a portion of the circulating slurry, passing the withdrawn slurry to a reaction system, and varying the quantity of flowing liquid responsive to changes in pressure on said circulating system.

2. A process for feeding subdivided solids to a reaction system which comprises withdrawing the solids from a source of supply, introducing said solids directly to a confined zone adapted to contain a bed of said solids, maintaining the confined zone free from moisture, withdrawing solids from the confined zone, slurrying the solids in a measured amount of flowing liquid, introducing the resulting solids-liquid slurry to a circulating system having a point of withdrawal by which slurry is continuously passed, withdrawing a portion of the circulating slurry, passing the withdrawn slurry to a reaction system and varying the quantity of flowing liquid introduced responsive to changes in pressure on said circulating system.

3. The process of claim 1 in which said confined zone is kept free from moisture by maintaining said zone liquid full of liquid having the same composition as said flowing liquid.

4. A process for feeding a subdivided solid catalyst to a reaction system wherein polymerization of olefins is effected in the presence of a solvent at an elevated temperature and pressure, which comprises withdrawing the catalyst from a source of supply, introducing the catalyst directly to a confined zone adapted to contain a bed of said catalyst, maintaining the confined zone free from moisture, withdrawing catalyst from the confined zone, slurrying the catalyst in a measured amount of flowing solvent, varying the rate of catalyst withdrawal responsive to changes in the quantity of flowing solvent, introducing the resulting catalyst-solvent slurry to a circulating system having a point of withdrawal by which slurry is continuously passed, withdrawing a portion of the circulating slurry, passing the withdrawn slurry to a reaction system and varying the quantity of flowing solvent responsive to changes in pressure on said circulating system.

5. The process of claim 4 in which the confined zone is kept free from moisture by maintaining therein an inert gas atmosphere.

6. The process of claim 4 in which the confined zone is kept free from moisture by maintaining said zone liquid-full of said solvent.

7. Apparatus for slurrying a subdivided solid in a liquid, which apparatus comprises, in combination: conduit means adapted for the flow of a liquid material therethrough; eduction means disposed in said conduit means; means for introducing solids into the eduction means and forming a slurry of solids in the liquid; positive displacement means for varying the quantity of solids introduced into the eduction means; means for actuating said positive displacement means with the liquid flowing through said conduit means; loop conduit means openly communicating with the downstream terminus of the eduction means; means for maintaining continuous flow in said loop conduit means; and means for withdrawing slurry from said loop conduit means.

8. The apparatus of claim 7 in which the positive displacement means comprises a star valve.

9. The apparatus of claim 7 in which the positive displacement means comprises a pump.

10. The apparatus of claim 7 in which said eduction means is in open communication with the suction of a second eduction means disposed in said loop conduit means.

11. Apparatus for slurrying a subdivided solid in a liquid, which apparatus comprises, in combination: conduit means adapted for the flow of a liquid material therethrough; eduction means disposed in said conduit means; means for introducing solids into the eduction means and forming a slurry of solids in the liquid; positive displacement means for varying the quantity of solids introduced to the eduction means; means for actuating said positive displacement means with the liquid flowing through said conduit means; loop conduit means openly communicating with the downstream terminus of the eduction means; means for maintaining a continuous flow in said loop conduit means; means for withdrawing slurry from said loop conduit means for introduction to a reaction system; and means for varying the flow of liquid to the eduction means in response to changes in pressure in said loop conduit means.

12. A process for supplying comminuted solids to a reaction system which process comprises adding said solids to a stream of liquid to form a suspension of said solids in said liquid, introducing the resulting suspension into a loop conduit, maintaining said suspension in circulation in said loop conduit, withdrawing a portion of said suspension from said loop conduit, passing the withdrawn suspension to a reaction system, varying the rate of supply of said liquid to said loop conduit in response to changes in pressure in said loop conduit thereby maintaining a desired pressure in said loop conduit and varying the rate of solids addition to said stream of liquid responsive to changes in quantity of liquid supplied to said loop thereby maintaining a desired concentration of solids in said liquid.

13. Apparatus for supplying a suspension of solids to a reaction zone, which apparatus comprises, in combination: a loop conduit having an inlet and an outlet; means for turbulently propelling a suspension of solids through said loop conduit; pressure-sensing means in communication with the interior of said loop conduit; and means, responsive to said pressure-sensing means, to regulate flow rate through said inlet.

14. Apparatus for supplying a suspension of solids to a reaction zone, which apparatus comprises, in combination: a loop conduit having an inlet and an outlet; means for turbulently propelling a suspension of solids through said loop conduit; pressure-sensing means in communication with the interior of said loop conduit; means, responsive to said pressure-sensing means, for regulating rate of flow through said inlet; means for introducing comminuted solids into said inlet at variable rates; and means, responsive to fluid flow rate in said inlet, to control the rate of introduction of comminuted solids into said inlet.

15. Apparatus for supplying a suspension of solids to a reaction zone, which apparatus comprises, in combination: a series of conduits arranged to form a loop, said loop having an inlet and an outlet; means for turbulently propelling a suspension of solids through said loop; means for withdrawing said suspension through said outlet for introduction to a reaction zone; pressure-sensing means in communication with the interior of one of the conduits forming said loop; a valve in said inlet; a controller operatively connected to said valve and said pressure-sensing means adapted to open further said valve when lower pressure is sensed and to close further said valve when higher pressure is sensed; means to measure flow of liquid through said inlet; a comminuted solids supply conduit communicating with said inlet; means to control flow in said comminuted solids supply conduit; a controller operatively connected to said means to measure flow through said inlet and said means to control flow in said comminuted solids supply conduit, said controller increasing flow of solids when flow of liquid is increased and decreasing flow of solids when flow of liquid is decreased.

References Cited in the file of this patent

UNITED STATES PATENTS

| | | |
|---|---|---|
| 2,376,833 | Teter | May 22, 1945 |
| 2,405,959 | Kuhl et al. | Aug. 20, 1946 |
| 2,424,147 | Campbell | July 15, 1947 |
| 2,590,219 | Stephanoff | Mar. 25, 1952 |
| 2,677,001 | Fragen | Apr. 27, 1954 |
| 2,728,641 | Thorp et al. | Dec. 27, 1955 |
| 2,886,616 | Mertz et al. | May 12, 1956 |